(12) United States Patent
Shinoki et al.

(10) Patent No.: US 9,574,701 B2
(45) Date of Patent: Feb. 21, 2017

(54) VACUUM HEAT INSULATOR, HEAT RETAINING TANK INCLUDING SAME, HEAT RETAINING STRUCTURE, AND HEAT PUMP WATER HEATER

(71) Applicant: MITSUBISHI ELECTRIC CORPORATION, Chiyoda-ku (JP)

(72) Inventors: Toshio Shinoki, Chiyoda-ku (JP); Shunkei Suzuki, Chiyoda-ku (JP); Toshinori Sugiki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/767,173

(22) PCT Filed: Feb. 4, 2014

(86) PCT No.: PCT/JP2014/052586
§ 371 (c)(1),
(2) Date: Aug. 11, 2015

(87) PCT Pub. No.: WO2014/162771
PCT Pub. Date: Oct. 9, 2014

(65) Prior Publication Data
US 2015/0377407 A1 Dec. 31, 2015

(30) Foreign Application Priority Data
Apr. 5, 2013 (JP) .................................. 2013-079684

(51) Int. Cl.
*F16L 59/065* (2006.01)
*F24D 11/02* (2006.01)
*F24D 17/02* (2006.01)
*D04H 1/4391* (2012.01)
*B65D 81/38* (2006.01)
*C03B 37/16* (2006.01)

(52) U.S. Cl.
CPC .......... *F16L 59/065* (2013.01); *B65D 81/3813* (2013.01); *B65D 81/3825* (2013.01); *D04H 1/4391* (2013.01); *F24D 11/0214* (2013.01); *F24D 17/02* (2013.01); *C03B 37/16* (2013.01); *Y02B 30/126* (2013.01)

(58) Field of Classification Search
CPC ........................... Y10T 428/231; F16L 59/065
USPC ......................................................... 428/69
See application file for complete search history.

(56) References Cited

U.S. PATENT DOCUMENTS 5,795,639 A    8/1998    Lin
8,911,847 B2    12/2014    Shinoki et al.

FOREIGN PATENT DOCUMENTS

| DE | 11 2010 001 540 T5 | 5/2012 |
|---|---|---|
| JP | 9-11374 A | 1/1997 |
| JP | 11-505591 A | 5/1999 |

(Continued)

OTHER PUBLICATIONS

Office Action issued on Mar. 15, 2016 in Japanese Patent Application No. 2015-509936 (with English language translation).

(Continued)

*Primary Examiner* — Alexander Thomas
(74) *Attorney, Agent, or Firm* — Oblon, McClelland, Maier & Neustadt, L.L.P.

(57) ABSTRACT

A vacuum heat insulator includes a core member that is a stack of fibrous sheets and a cover member enclosing the core member. Each of the fibrous sheets includes curved chopped fibers and curved fibers.

11 Claims, 5 Drawing Sheets

(56) References Cited

FOREIGN PATENT DOCUMENTS

| | | |
|---|---|---|
| JP | 2009-162267 A | 7/2009 |
| JP | 2010-7683 A | 1/2010 |
| JP | 2010-242868 A | 10/2010 |
| JP | 2011-257012 A | 12/2011 |
| JP | 2013-238283 A | 11/2013 |
| WO | 96/28624 | 9/1996 |
| WO | 2013/121992 A1 | 8/2013 |

OTHER PUBLICATIONS

Combined Office Action and Search Report issued on Apr. 20, 2016 in Chinese Patent Application No. 201480019540.2 with partial English translation and English translation of category of cited documents.
International Search Report issued Apr. 15, 2014 in PCT/JP2014/052586 filed Feb. 4, 2014.
Extended European Search Report issued Nov. 14, 2016 in Patent Application No. 14779889.6.

DIRECTION OF
REPETITIVE TURNING

DIRECTION OF
REPETITIVE TURNING

VACUUM HEAT INSULATOR, HEAT RETAINING TANK INCLUDING SAME, HEAT RETAINING STRUCTURE, AND HEAT PUMP WATER HEATER

TECHNICAL FIELD

The present invention relates to a vacuum heat insulator, a heat retaining tank including the vacuum heat insulator, a heat retaining structure, and a heat pump water heater.

BACKGROUND ART

A heat insulator including a stack of inorganic fibers and crimped fibers has recently been developed to improve resilience after compression for efficient packing during transport or the like of the heat insulator in order to increase heat insulating performance (refer to Patent Literature 1, for example). As used herein, the term "resilience" refers to as the ability of a heat insulator to return to its original shape after being compressed.

Furthermore, a vacuum heat insulator recently developed to increase heat insulating performance includes a core member composed of inorganic fibers, such as glass fibers, made by a continuous filament process (refer to Patent Literature 2, for example).

According to a technique described in Patent Literature 2, the inorganic fibers are allowed to have an average fiber diameter greater than or equal to 3 μm and less than or equal to 15 μm in order to suppress, for example, an increase in area of contact between the fibers caused by entanglement of the fibers. This reduces heat conduction between the inorganic fibers.

According to the technique described in Patent Literature 2, the inorganic fibers are also allowed to have an average fiber length greater than or equal to 3 mm and less than or equal to 15 mm in addition to the above-described average fiber diameter. A wet paper-making process involving addition of a dispersant is used to achieve dispersion of the inorganic fibers. This makes the inorganic fibers less likely to align parallel to one another. Consequently, the inorganic fibers tend to have point contact, thus reducing heat conduction between the inorganic fibers.

CITATION LIST

Patent Literature

Patent Literature 1: Japanese Unexamined Patent Application Publication No. 9-11374 (refer to FIG. 1 and Abstract, for example)
Patent Literature 2: Japanese Unexamined Patent Application Publication No. 2009-162267 (refer to claim 2, [0040], [0046], and [0052], for example)

SUMMARY OF INVENTION

Technical Problem

According to a technique described in Patent Literature 1, some of the fibers are allowed to have an axis extending in a fiber stacking direction (or heat transfer direction) so that the fibers enclosed in the heat insulator act like springs in order to increase the resilience of the heat insulator. If the technique described in Patent Literature 1 is applied to a vacuum heat insulator, solid heat conduction from the fibers in the fiber stacking direction will increase.

The fibers require a predetermined thickness so that the fibers act like springs in the heat insulator. The area of contact between the fibers accordingly increases, resulting in an increase in heat conduction.

As described above, the use of a structure including the crimped fibers described in Patent Literature 1 as a core member of a vacuum heat insulator results in an increase in heat conduction because "the axes of some of the fibers extend in the fiber stacking direction (heat transfer direction)" and "the fibers require a predetermined thickness", leading to a reduction in heat insulating performance of the vacuum heat insulator.

According to the technique described in Patent Literature 2, the inorganic fibers are allowed to have an average diameter greater than or equal to 3 μm and less than or equal to 15 μm. The inorganic fibers accordingly have increased straightness. As the straightness is higher, it is more difficult to form a stacked structure of fibers. A binder which is used to bind the inorganic fibers is accordingly added by an amount corresponding to an increase in straightness. As used herein, the term "straightness" refers to the degree of deviation from a straight line. Addition of the binder results in bonding of the inorganic fibers. This promotes heat conduction at contacts of the fibers in the stacked structure.

In other words, the technique described in Patent Literature 2 has the following disadvantage: the inorganic fibers have increased straightness and the binder is accordingly added to the fibers to be enclosed in the vacuum heat insulator. This results in an increase in heat conduction, leading to a reduction in heat insulating performance of the vacuum heat insulator.

The inorganic fibers may be temporarily formed into a sheet with the binder and the binder may then be removed by heat treatment, thus suppressing a reduction in heat insulating performance. Disadvantageously, such a method requires extra equipment and extra energy, resulting in an increase in manufacturing cost.

The present invention has been made to solve at least one of the above-described disadvantages. The present invention aims to provide a vacuum heat insulator with little reduction in heat insulating performance, a heat retaining tank including the vacuum heat insulator, a heat retaining structure, and a heat pump water heater.

Solution to Problem

The present invention provides a vacuum heat insulator including a core member that is a stack of fibrous sheets and a cover member enclosing the core member. Each of the fibrous sheets includes curved chopped fibers and curved fibers.

Advantageous Effects of Invention

The above-described configuration of the vacuum heat insulator according to the present invention can suppress a reduction in heat insulating performance.

DESCRIPTION OF EMBODIMENTS

Embodiments of the present invention will be described with reference to the drawings.

Embodiment 1

Figure 1:
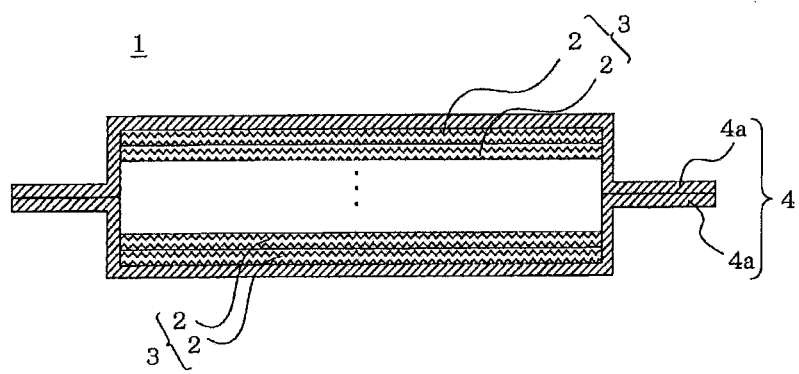
FIG. 1 is a schematic longitudinal sectional view of a vacuum heat insulator according to Embodiment 1 of the present invention.
Figure 2:
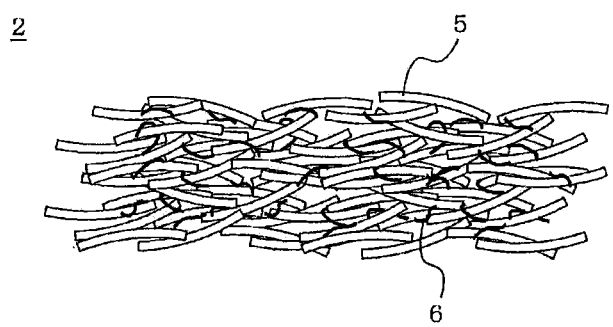
FIG. 2 is a schematic enlarged longitudinal sectional view of a fibrous sheet of the vacuum heat insulator according to Embodiment 1 of the present invention.

FIG. 1 is a schematic longitudinal sectional view of a vacuum heat insulator 1 according to Embodiment 1. FIG. 2 is a schematic enlarged longitudinal sectional view of a fibrous sheet 2 of the vacuum heat insulator 1 according to Embodiment 1.

The vacuum heat insulator 1 according to Embodiment 1 has undergone improvement that allows for an increase in heat insulating performance.

The vacuum heat insulator 1 includes a core member 3 formed of a stack of the fibrous sheets 2 composed of glass fibers and a cover member 4 including cover sheets 4a composed of, for example, resin, and enclosing the core member 3.

[Core Member 3]

As illustrated in FIG. 1, the core member 3 is a stack of the fibrous sheets 2, cut in a predetermined size, arranged vertically in FIG. 1. The core member 3 is enclosed in the cover member 4. The number of fibrous sheets 2 stacked and the thickness of the stacked fibrous sheets 2 are set in consideration of, for example, compressive strain caused by pressure difference between atmospheric pressure and vacuum pressure so that the vacuum heat insulator 1 has a desired thickness.

Each of the fibrous sheets 2 includes curved chopped fibers 5 made of, for example, glass, and microfibers 6 made of the same material as that for the curved chopped fibers 5, for example, glass, such that the curved chopped fibers 5 and the microfibers 6 are mixed together.

As regards how to make the fibrous sheet 2, for example, the curved chopped fibers 5 and the microfibers 6 are dispersed in neutral water or a sulfuric acid aqueous solution and are subjected to paper-making by an automatic feed type paper-making machine, thus forming the fibers into a sheet-shaped object. The sheet-shaped object is dried, thus obtaining a raw nonwoven fabric for the fibrous sheet 2 having a thickness of approximately 0.5 mm to approximately 5 mm. The raw nonwoven fabric for the fibrous sheet 2 is cut into pieces, serving as the fibrous sheets 2, each having an area corresponding to that of the vacuum heat insulator 1 to be produced, thus obtaining the fibrous sheet 2.

Note that paper-making is performed so that the fibers in the fibrous sheet 2 extend substantially perpendicular to the thickness of the fibrous sheet 2.

An inorganic binder or an organic binder may be added to the fiber-dispersed solution or the fibers subjected to paper-making. Examples of inorganic binders include water glass and colloidal silica. Examples of organic binders include polyurethanes (PUs) and polyvinyl alcohols (PVAs).

(Curved Chopped Fibers 5)

The curved chopped fibers 5 have a larger average fiber diameter than the microfibers 6. The curved chopped fibers 5 are made as follows, for example.

(1) A filament (glass fiber) having a relatively uniform diameter ranging from approximately 4 m to approximately 20 m is made by a continuous filament process.

(2) The filament made in (1) is then allowed to pass through the mesh of two gears heated at a temperature at which the raw material is softened and which is lower than the melting point of the raw material. Consequently, the filament made in (1) thermally deforms, so that a curved inorganic filament 8 having a wavy shape is made (refer to FIG. 3).

(3) The curved inorganic filament 8 made in (2) is cut into pieces having a predetermined length ranging from approximately 4 mm to approximately 18 mm, thus obtaining the curved chopped fibers 5.

The curved inorganic filament 8 may be made by any suitable method other than that in (2) described above. For example, an extruded fiber may be wound around a cylindrical core to form a coil-shaped filament (refer to FIG. 4).

(Microfibers 6)

The microfibers 6 are fibers that contribute to sheet formation, because it is difficult to form only the curved chopped fibers 5 into a sheet, serving as the fibrous sheet 2. The microfibers 6 have a smaller average fiber diameter than the curved chopped fibers 5. As illustrated in FIG. 2, the microfibers 6 and the curved chopped fibers 5 are mixed together in the fibrous sheet 2.

The microfibers 6 are typically made as follows. The microfibers 6 having a fiber diameter smaller than a certain set value (e.g., 3 μm) are made by flame treatment. The microfibers 6 having a fiber diameter larger than this set value are made by a centrifugal method. Embodiment 1 is described on the assumption that the vacuum heat insulator 1 includes the microfibers 6 made by the flame treatment.

Although Embodiment 1 is described on the assumption that the curved chopped fibers 5 and the microfibers 6 are glass fibers, the present invention is not limited thereto. For example, the curved chopped fibers 5 and the microfibers 6 may be ceramic fibers or silica fibers.

The microfibers 6 may be organic fibers. For example, polyester fibers or polypropylene fibers having an average diameter of several micrometers can be made by a meltblown process. In this case, drying conditions have to be in a temperature range in which the organic fibers to be included in the vacuum heat insulator 1 are not decomposed or melted (including softened in some cases).

Although Embodiment 1 is described as applied to the case where the curved chopped fibers 5 and the microfibers 6 are the same glass fibers, the present invention is not limited thereto. The curved chopped fibers 5 and the microfibers 6 may be fibers made of different materials.

[Cover Member 4]

The cover member 4 receives the core member 3, including the stacked fibrous sheets 2 including the curved chopped fibers 5 and the microfibers 6, between the two cover sheets 4a. The cover member 4 is a laminate consisting of, for example, a 25 μm thick oriented nylon (ON) film, a 12 μm thick polyester (PET) film, a 7 μm thick aluminum (AL) foil, and a 30 μm thick casted polypropylene (CPP) film arranged in that order from the outside. A method of making the vacuum heat insulator 1 by inserting the core member 3 into the cover member 4 will now be described.

(1) First, the cover sheets 4a are formed into a bag, thus making the cover member 4. The core member 3 is dried and is then inserted together with a gas adsorbent into the cover member 4.

(2) After that, an object obtain in (1) is disposed in a vacuum chamber.

(3) The vacuum chamber is pressure-reduced to a predetermined pressure, for example, a vacuum pressure ranging from, for example, approximately 0.1 Pa to approximately 3 Pa. An opening remaining in the cover member 4 is tightly closed by heat sealing under such a condition.

(4) The vacuum chamber is returned to atmospheric pressure. After that, the vacuum heat insulator 1 can be taken out of the vacuum chamber. The vacuum heat insulator 1 is made in this manner.

The two cover sheets 4a and the core member 3 may be arranged in the vacuum chamber such that the core member 3 is sandwiched between the cover sheets 4a. The vacuum chamber may be pressure-reduced. After that, the peripheries of the upper and lower cover sheets 4a may be tightly closed by heat sealing.

As regards moisture contained in the fibrous sheet 2, a process of heating the fibrous sheet 2 may be performed before or after cutting in addition to the drying process during paper-making. Alternatively, the heating process may be performed during processing under vacuum in order to remove the moisture. Examples of gas adsorbents include calcium oxide (CaO), zeolite, iron powder, lithium, and barium, which may be used solely or in combination.

[Thermal Conductivity of Vacuum Heat Insulator 1]

Figure 3:
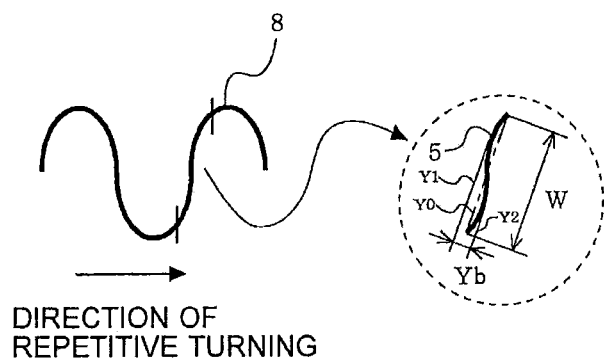
FIG. 3 is a schematic enlarged longitudinal sectional view of a wavy fiber for the vacuum heat insulator according to Embodiment 1 of the present invention.
Figure 4:
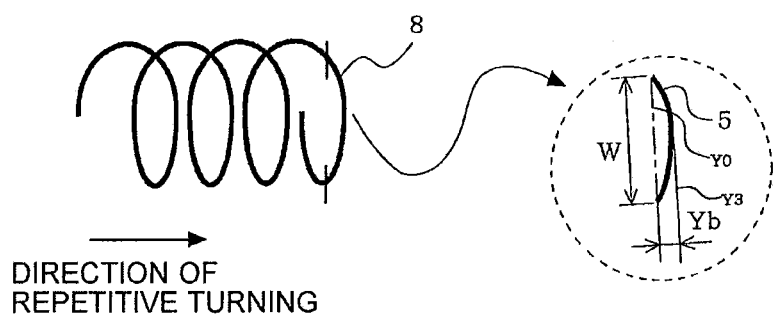
FIG. 4 is a schematic enlarged longitudinal sectional view of a spiral fiber for the vacuum heat insulator according to Embodiment 1 of the present invention.
Figure 5:
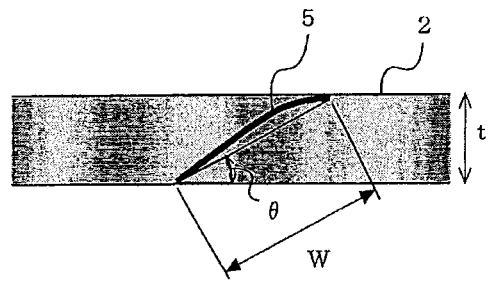
FIG. 5 is a schematic enlarged longitudinal sectional view of the fibrous sheet of the vacuum heat insulator according to Embodiment 1 of the present invention.
Figure 6:
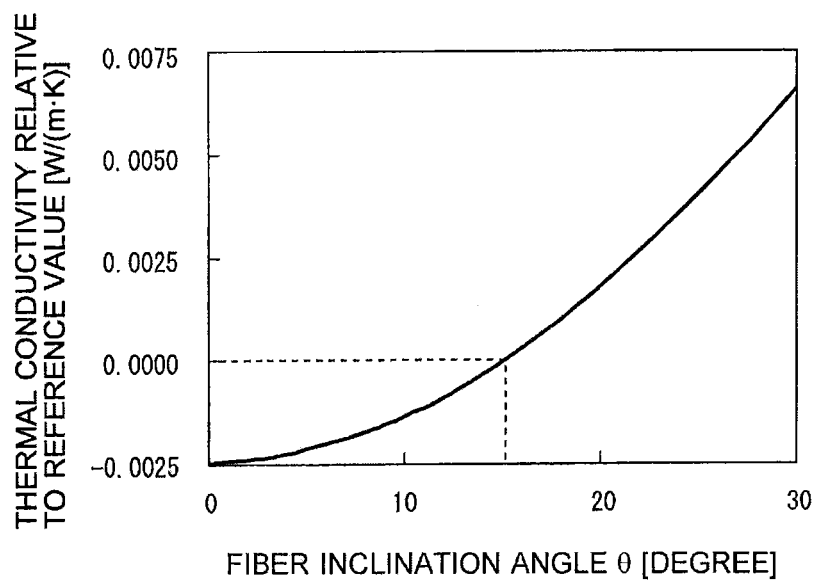
FIG. 6 illustrates a result of model calculation of the relationship between a fiber inclination angle and thermal conductivity of the vacuum heat insulator according to Embodiment 1 of the present invention.

FIG. 3 is a schematic enlarged longitudinal sectional view of a wavy fiber for the vacuum heat insulator 1 according to Embodiment 1. FIG. 4 is a schematic enlarged longitudinal sectional view of a spiral fiber for the vacuum heat insulator 1 according to Embodiment 1. FIG. 5 is a schematic enlarged longitudinal sectional view of the fibrous sheet 2 in the vacuum heat insulator 1 according to Embodiment 1. FIG. 6 illustrates a result of model calculation of the relationship between a fiber inclination angle θ and thermal conductivity of the vacuum heat insulator 1 according to Embodiment 1. The thermal conductivity of the vacuum heat insulator 1 will be described with reference to FIGS. 3 to 6.

In FIGS. 3 to 5, W denotes a cut length of the curved inorganic filament 8 and represents the length of a line connecting both ends of the curved chopped fiber 5 and Yb denotes a straightness deviation. Specifically, the value Yb is determined based on the positions of tangents (corresponding to a first tangent Y1 and a second tangent Y2 which will be described later) to parts of the curved chopped fiber 5 which are parallel to a reference line Y0, serving as a straight line connecting both the ends of the curved chopped fiber 5, and which are furthest from the reference line Y0. For example, in the case of FIG. 3, an interval between the first tangent Y1 and the second tangent Y2 corresponds to Yb. In the case of FIG. 4, only one tangent can be placed. Accordingly, an interval between the reference line Y0 and a tangent Y3 corresponds to Yb. As described above, Yb corresponds to a maximum distance in a direction orthogonal to a direction in which the curved chopped fiber 5 extends. In addition, θ denotes the angle of inclination of the fiber to a fiber stack surface of the fibrous sheet 2 and t denotes the thickness of the fibrous sheet 2 subjected to vacuum sealing.

As will be described below, the vacuum heat insulator 1 according to Embodiment 1 includes the curved chopped fibers 5 and the microfibers 6 and includes the fibrous sheets 2 formed without addition of any binder, thus achieving little reduction in heat insulating performance. Specifically, although an inorganic binder or an organic binder may be added as necessary as described above, the fibrous sheets 2 are formed without addition of any binder in Embodiment 1.

Details of the configuration, for example, the fiber diameters and lengths of the curved chopped fibers 5 and the microfibers 6 and mixture proportions of the fibers, will now be described. To explain improved heat insulating performance of the vacuum heat insulator 1, "Comparative Example 1" and "Comparative Example 2" will be described. In addition, the "cut length W" and the "fiber inclination angle θ" will be described.

(Details of Configuration of Vacuum Heat Insulator 1 According to Embodiment 1)

A straight inorganic filament having an average fiber diameter φ of approximately 6 μm was made by the continuous filament process. The inorganic filament was allowed to pass between the gears heated at, for example, approximately 600 degrees C., thus shaping the inorganic filament into a wavy form. Consequently, the curved inorganic filament 8 was made. The curved inorganic filament 8 was cut into the curved chopped fibers 5 having a cut length W of approximately 6 mm. In this case, the straightness deviation Yb was approximately 0.9 mm.

The microfibers 6 having an average fiber diameter φ of approximately 1 μm and an average fiber length of approximately 1 mm were made by the flame treatment.

The curved chopped fibers 5 having "φ=approximately 6 m", "W=approximately 6 mm", and "Yb=approximately 0.9 mm" and the microfibers 6 having "φ=approximately 1 μm" and the "average fiber length of approximately 1 mm" were mixed such that a mixture proportion of the curved chopped fibers 5 was 60 wt % and that of the microfibers 6 was 40 wt %, thus making the fibrous sheet 2.

The fibrous sheet 2 was made by a paper-making process using the above-described automatic feed type paper-making machine such that the fibrous sheet 2 subjected to paper-making and drying had a thickness t of approximately 1 mm.

Although the fibrous sheet 2 including the curved chopped fibers 5 in a mixture proportion less than 60 wt % was also made, sheet formation of the fibrous sheet 2 including the curved chopped fibers 5 in a mixture proportion of 60 wt % was accomplished without any binder. As used herein, the term "mixture proportion" refers to a percentage relative to the total weight of fibers. Specifically, the curved chopped fibers 5 in a mixture proportion of 60 wt % means that the curved chopped fibers 5 account for 60% of the total weight of the fibrous sheet 2 including the curved chopped fibers 5 and the microfibers 6.

As will be described in detail later, as the mixture proportion of the curved chopped fibers 5 is higher, the heat insulating performance is higher under a certain condition. Accordingly, the thermal conductivity in an upper limit mixture proportion, 60 wt %, of the curved chopped fibers 5 will be described below.

In the fibrous sheet 2 made in the above-described manner, significant binding of the fibers was not observed. The vacuum heat insulator 1 was made with the fibrous sheets 2 under the same conditions as those in Comparative Example 1, which will be described later. Thermal conductivity of the vacuum heat insulator 1 was measured to be 0.0015 W/(m·K).

Comparative Example 1

Straight Chopped Fibers

In the following description, in order to distinguish the vacuum heat insulator 1 according to Embodiment 1 and the components (e.g., the fibrous sheets 2) of the vacuum heat insulator 1 from equivalents in Comparative Examples, reference numerals indicating those in Comparative Examples are assigned "'".

To compare with the vacuum heat insulator 1 according to Embodiment 1, a vacuum heat insulator 1' was made using straight chopped fibers which were not subjected to shaping into a curved form, instead of the curved chopped fibers 5.

As regards a mixture proportion of the straight copped fibers and that of microfibers 6', the degree of entanglement of these fibers was lower than that of the curved chopped fibers 5 and the microfibers 6 and it was accordingly difficult to form the fibers into a sheet. An upper limit mixture proportion of the straight chopped fibers was 40 wt %. In other words, the straight chopped fibers in a mixture proportion higher than 40 wt % caused little or no entanglement of the fibers. This did not allow sheet formation. In Comparative Example 1, the mixture proportion of the straight chopped fibers was 40 wt % and that of the microfibers 6' was 60 wt %.

Other conditions were the same as those for making the vacuum heat insulator 1.

Specifically, the straight chopped fibers were made by the continuous filament process. The values θ and W of the straight chopped fibers were the same as those of the curved chopped fibers 5. The microfibers 6' were made by the flame treatment. The value φ and the fiber length of the microfibers 6' were the same as those of the microfibers 6. No binder was used. Furthermore, a fibrous sheet 2' was made by the paper-making process using the above-described automatic feed type paper-making machine such that the fibrous sheet 2' subjected to paper-making and drying had a thickness t of 1 mm.

Thermal conductivity of the vacuum heat insulator 1' including the straight chopped fibers made in the above-described manner was measured to be 0.0018 W/(m·K).

As regards the thickness of the sheet in each of the vacuum heat insulator 1 and the vacuum heat insulator 1', although the thickness was approximately 1 mm after paper-making, the thickness was reduced to approximately 0.65 mm due to atmospheric pressure after vacuum sealing.

Comparative Example 2

Straightness Deviation Yb

In Comparative Example 2, the straightness deviation Yb of the curved chopped fibers 5 was investigated. In Comparative Example 2, the conditions other than the straightness deviation Yb were the same as those for the vacuum heat insulator 1.

Specifically, a mixture proportion of curved chopped fibers 5' was 60 wt % and that of microfibers 6' was 40 wt %. The curved chopped fibers 5' were made by the continuous filament process. The values φ and W of the curved chopped fibers 5' were the same as those of the curved chopped fibers 5. The value Yb of the curved chopped fibers 5' was 2 mm.

The microfibers 6' were made by the flame treatment. The value p and the fiber length of the microfibers 6' were the same as those of the microfibers 6. No binder was used. Furthermore, a fibrous sheet 2' was made by the paper-making process using the above-described automatic feed type paper-making machine such that the fibrous sheet 2' subjected to paper-making and drying had a thickness t of 1 mm.

As a result, although the fibrous sheet 2' was produced, thermal conductivity of a vacuum heat insulator 1' made using the fibrous sheets 2' was 0.0025 W/(m·K). Lower heat insulating performance than the vacuum heat insulator 1 was observed.

(Relationship Between Fiber Inclination Angle θ and Thermal Conductivity)

If the cut length W of the fibers of the curved inorganic filament 8 is short, the angle of inclination of each fiber to the stack surface may be increased during paper-making, as illustrated in FIG. 5. Model calculation of the relationship between the fiber inclination angle θ and the thermal conductivity was performed. FIG. 6 illustrates an analytic result of the calculation.

The calculation result, in which a reference value is at θ=15 degrees, of FIG. 6 demonstrates that as the fiber inclination angle θ is larger, the rate of increase in thermal conductivity is higher. It can therefore be seen that as the fiber inclination angle θ is allowed to approach zero as much as possible, lower thermal conductivity is achieved.

The relationship among the thickness t of the fibrous sheet 2 after vacuum sealing, the cut length W of the curved chopped fibers 5, and the fiber inclination angle θ is expressed as sin θ=t/W, as illustrated in FIG. 5. In order to reduce the thermal conductivity of the vacuum heat insulator 1, it is preferred that the fiber inclination angle be reduced to 15 degrees or less, preferably, 10 degrees or less. The reason will be described later.

In Comparative Example 2, the vacuum heat insulator 1' had a large value Yb, 2 mm. If the fiber is disposed such that the fiber has an upwardly protruding curvature in FIG. 5, the actual inclination angle (corresponding to θ in FIG. 5) of the curved chopped fiber 5' would increase. This may facilitate upward heat transfer. Considering the inclination angle of the curved chopped fiber 5' and the degree of curvature thereof, it is preferred that Yb/W be less than or equal to 0.2.

Furthermore, it is preferred that the value Yb be less than the thickness t of the fibrous sheet 2. The reason is as follows. In most cases, the curved chopped fibers 5 are curved in a substantially arc shape. If a plane including the arc extends along the thickness of the fibrous sheet 2, the value Yb greater than or equal to the thickness t (in this case, Yb=2 mm and t=1 mm) will allow one curved chopped fiber 5 to connect an upper surface and a lower surface of the fibrous sheet 2, resulting in an increase in heat transfer. This may also cause, for example, sliding and movement of the fiber, a change in inclination angle, and bending and deformation of the fiber during vacuum sealing.

The value Yb less than the thickness t (in the above-described case, Yb=0.9 mm and t=1 mm) reduces a likelihood that one curved chopped fiber 5 will connect the upper and lower surfaces of the fibrous sheet 2, thus suppressing an increase in heat transfer. This may also reduce, for example, sliding and movement of the fiber, a change in inclination angle, and bending and deformation of the fiber during vacuum sealing.

Sections of a stack of glass fibers included in the core member 3 of the vacuum heat insulator 1 were observed. Fiber inclination angles were calculated from a data set containing 100 samples in total about a major axis, minor axis, and a longitudinal sectional inclination angle. Sample values ranged from 20 degrees to 30 degrees. The average of these values was approximately 27 degrees.

Assuming that an average inclination angle of irregularly inclined and distributed fibers corresponding to the microfibers 6 was 45 degrees, an inclination angle of other fibers corresponding to the curved chopped fibers 5 was expressed as X degree and the value X at which a mixture of 40% former fibers and 60% latter fibers had an average angle of 27 degrees was obtained. Thus, X=15 degrees.

In order to achieve higher heat insulating performance of the vacuum heat insulator 1, it is preferred that the inclination angle of the curved chopped fibers 5 be less than or equal to 15 degrees.

Specifically, the cut length W may be W≥t/sin 15 degrees, preferably, W≥t/sin 10 degrees. For example, considering the fibrous sheet 2 in which t=0.65 mm and θ=10 degrees, W≥3.74 mm. It can be seen that the cut length may be greater than or equal to approximately 3.7 mm.

A lower limit of the value Yb was examined using the cut lengths W of the curved chopped fibers 5 in the range of 3.7 mm≤W≤20 mm under the same conditions as those in Comparative Example 2, except for the value Yb. A value Yb/W less than 0.1 caused tensile strength of the produced fibrous sheet 2 to be lowered. The fibrous sheet 2 was difficult to handle, for example, wind up into a roll.

As regards the curved chopped fibers 5, therefore, it is preferred that the value W be greater than or equal to 3.7 mm and the value Yb/W be greater than or equal to 0.1 and less than or equal to 0.2. This facilitates fiber sheet formation and increases the heat insulating performance of the vacuum heat insulator 1 including the core member composed of the fibrous sheets 2.

(Relationship Between Fiber Diameter and Thermal Conductivity of Curved Chopped Fibers 5)

Furthermore, in order to examine a proper range of fiber diameters of the curved chopped fibers 5, a model analysis calculation was performed with respect to the vacuum heat insulator 1 including the core member 3 including the curved chopped fibers 5 in a mixture proportion of 60 wt % and the microfibers 6 in a mixture proportion of 40 wt %.

The relationship between the fiber diameter and the thermal conductivity of the curved chopped fibers 5 was examined. The axis of each curved chopped fiber 5 tends to be parallel to the stack surface of the fibrous sheet 2 and the fiber inclination angle θ of the curved chopped fiber 5 is accordingly small. Since the fiber inclination angle θ is small as described above, the thermal conductivity of the curved chopped fiber 5 is accordingly low. As the fiber diameter of the curved chopped fiber 5 is larger, however, the thermal conductivity is higher.

In a vacuum heat insulator 1 including a core member 3 composed of fibrous sheets 2 each including 100% microfibers 6, the axes of the fibers were distributed at random. Accordingly, the values θ were large on average, resulting in higher thermal conductivity than the mixture of the curved chopped fibers 5 and the microfibers 6.

A vacuum heat insulator 1 including the curved chopped fibers 5 having a fiber diameter of approximately 20 μm was compared with the vacuum heat insulator 1 including 100% microfibers 6. It was found that these vacuum heat insulators had the same thermal conductivity.

It is therefore preferred that the curved chopped fibers 5 have a fiber diameter less than or equal to 20 μm. Advantageously, the smaller the fiber diameter, the lower the thermal conductivity.

In the vacuum heat insulator 1 according to Embodiment 1, the average fiber diameter φ of the curved chopped fibers 5 is set to approximately 6 μm. The above-described advantage can accordingly be obtained.

[Advantages of Vacuum Heat Insulator 1 According to Embodiment 1]

The reason why the thermal conductivity of the vacuum heat insulator 1 according to Embodiment 1 can be reduced will now be described.

Shaping the curved inorganic filament 8 into a curved form improves the degree of entanglement of the curved chopped fibers 5 and the microfibers 6. Consequently, the fibrous sheet 2 including the microfibers 6 in a lower mixture proportion can be made.

In other words, the curved chopped fibers 5 are distributed substantially parallel to the stack surface without being three-dimensionally inclined in the stacking direction and the microfibers 6 whose axes tend to extend in the stacking direction are reduced. Advantageously, this may reduce solid heat conduction from the fibers.

Since the vacuum heat insulator 1 is binder-free, there is no reduction in degree of vacuum caused by gas generated from a binder, thus ensuring long-term reliability. Additionally, there is no increase in thermal conductivity caused by a reduction in thermal resistance of fiber contacts resulting from a binder.

As described above, an increase in manufacturing cost of the vacuum heat insulator 1 according to Embodiment 1 and a reduction in heat insulating performance thereof can be suppressed.

In the vacuum heat insulator 1 according to Embodiment 1, the curved chopped fibers 5, serving as a base material, made by shaping a straight filament formed by the continuous filament process into a curved form and cutting the filament are entangled with the microfibers 6 having a small fiber diameter and little heat transfer, thus achieving sheet formation.

Since the curved chopped fibers 5 in a higher mixture proportion than the straight chopped fibers can be mixed with the microfibers 6, the angles of inclination of the axes of the fibers relative to the stack surface of the fibrous sheet 2 can generally be reduced.

In addition, since the curved chopped fibers 5 are readily entangled with the microfibers 6, the fibrous sheet 2 can be made without binder addition.

The vacuum heat insulator 1 with little reduction in heat insulating performance as well as little increase in manufacturing cost can be achieved.

Embodiment 2

In Embodiment 2, the same components as those in Embodiment 1 are designated by the same reference numerals and the difference between Embodiment 2 and Embodiment 1 will be mainly described. In Embodiment 2, a variation in thermal conductivity depending on the mixture proportion of "straight chopped fibers or curved chopped fibers 5" and that of "microfibers 6" will be described.
(Details of Configuration of Vacuum Heat Insulator 1 According to Embodiment 2)

An exemplary configuration of a vacuum heat insulator 1 according to Embodiment 2 will be described.

The vacuum heat insulator 1 according to Embodiment 2 includes paper-making-processed sheets including the curved chopped fibers 5 and the microfibers 6 described in Embodiment 1 such that the mixture proportion of the curved chopped fibers 5 is 80 wt % and that of the microfibers 6 is 20 wt %. In other words, the mixture proportion of the curved chopped fibers 5 in Embodiment 2 is higher than that in Embodiment 1.

This takes into account the fact that increasing the mixture proportion of the curved chopped fibers 5 in a predetermined range can reduce thermal conductivity. Increasing the mixture proportion of the curved chopped fibers 5, however, tends to make it more difficult to form the fibrous sheet 2. According to Embodiment 2, the curved chopped fibers 5 and the microfibers 6 are formed into the fibrous sheet 2 with addition of approximately 0.5% binder.

As described above, the vacuum heat insulator 1 according to Embodiment 2 includes the curved chopped fibers 5 in a mixture proportion of 80 wt % and the microfibers 6 in a mixture proportion of 20 wt % to reduce thermal conductivity, and contains the binder, which is used to facilitate binding of the fibers. Thermal conductivity of the vacuum heat insulator 1 was measured to be 0.0014 W/(m·K).

The microfibers 6 having an average fiber diameter less than or equal to 8 μm are generally short and crimped due to manufacturing features. In forming the fibrous sheet 2, the short fibers are likely to incline in the stacking direction in the fibrous sheet 2, leading to an increase in solid heat conduction from the fibers.

The crimp of the fibers provides an irregular three-dimensional structure. Accordingly, the fibers are more likely to incline in the stacking direction.

On the other hand, the curved chopped fibers 5 have relatively high straightness. The axes of the curved chopped fibers 5 extend substantially perpendicular to the stacking direction in the fibrous sheet 2 having a proper thickness.

As long as the curved chopped fibers 5 have a proper diameter, a proper degree of curvature, and a proper length, the more the curved chopped fibers 5, the lower the solid heat conduction from the inorganic fibers.

As described above, the proportion of the curved chopped fibers 5 in the vacuum heat insulator 1 according to Embodiment 2 is higher than that in Embodiment 1. In addition, the vacuum heat insulator 1 according to Embodiment 2 contains the binder in an amount controlled so that a reduction in heat insulating performance of the vacuum heat insulator 1 can be suppressed.
(Details of Configuration of Vacuum Heat Insulator 1 According to Modification of Embodiment 2

Figure 13:
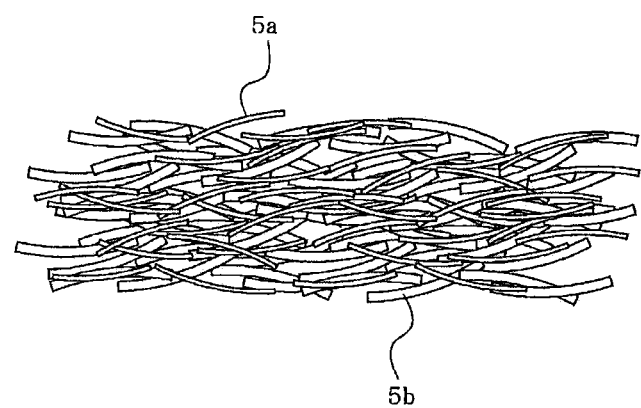
FIG. 13 is a schematic enlarged longitudinal sectional view of a fibrous sheet of a vacuum heat insulator according to Embodiment 2 of the present invention.

FIG. 13 is a diagram illustrating details of an exemplary configuration of a vacuum heat insulator 1 according to a modification of Embodiment 2. As illustrated in FIG. 13, a fibrous sheet 2 in the modification includes first curved chopped fibers 5b and second curved chopped fibers 5a. Specifically, although the fibrous sheet 2 in Embodiment 1 includes the curved chopped fibers 5 and the microfibers 6, serving as curved fibers, the fibrous sheet 2 in the modification of Embodiment 2 includes the first curved chopped fibers 5b and the second curved chopped fibers 5a, serving as curved fibers.

The first curved chopped fibers 5b are fibers made by the continuous filament process as in Embodiment 1. Embodiment 1 has been described as applied to the case where the curved inorganic filament 8 made by shaping the filament having an average fiber diameter ϕ of approximately 6 μm into a curved form is used. In this modification, a filament having an average fiber diameter ϕ of approximately 9 μm was shaped into a curved form, thus obtaining the curved inorganic filament 8. Specifically, the first curved chopped fibers 5b in the modification are fibers obtained by cutting the curved inorganic filament 8 having a diameter ϕ of approximately 9 μm into pieces having a cut length W of approximately 6 mm. The first curved chopped fibers 5b have a diameter ϕ of approximately 9 μm.

The second curved chopped fibers 5a are fibers made by the same process (continuous filament process) as that for the first curved chopped fibers 5b. The second curved chopped fibers 5a are obtained by cutting a curved inorganic filament 8, made by shaping a filament having an average fiber diameter ϕ of approximately 4 μm into a curved form, into pieces having a cut length W of approximately 6 mm. In other words, the second curved chopped fibers 5a have the same cut length W (fiber length) as that of the first curved chopped fibers 5b and the same degree of curvature, associated with Yb, as that of the first curved chopped fibers 5b, but have a different average fiber diameter ϕ from the first curved chopped fibers 5b. The average fiber diameter ϕ of the second curved chopped fibers 5a is approximately 4 μm.

In the modification, the fibrous sheet 2 was made so as to include the first curved chopped fibers 5b in a proportion of 80 wt % and the second curved chopped fibers 5a in a proportion of 20 wt % mixed together. The vacuum heat insulator 1 was made by the same procedure as that described in Embodiment 1, except that a process of making the fibrous sheet 2 required a binder in the modification. Specifically, during paper-making, a polyurethane binder in an amount of 1 wt % of the total weight of glass fibers was added and heat treatment was performed to join the glass fibers together, so that stable fibrous sheet formation was achieved. The fibrous sheets 2 were stacked in a manner similar to Embodiment 1 to form a core member, and the vacuum heat insulator 1 including the core member was made. Thermal conductivity of the vacuum heat insulator 1 was measured to be 0.0015 W/(m·K).

Specifically, in the vacuum heat insulator 1 according to Embodiment the modification, a reduction in binder content can be achieved by mixing the first curved chopped fibers 5b and the second curved chopped fibers 5a having a different average diameter ϕ from the first curved chopped fibers 5b. This results in a reduction in cost. In addition, the reduction in binder content reduces heat transfer, thus increasing heat insulating performance.

Although the modification has been described as applied to the case where the second curved chopped fibers 5a have a different average fiber diameter ϕ from the first curved chopped fibers 5b, the present invention is not limited thereto. For example, the cut length W (fiber length) or the degree of curvature of the second fibers may be different from that of the first fibers. Furthermore, more than one of these conditions, namely, the average fiber diameter ϕ, the cut length W, and the degree of curvature of the second fibers may be different from those of the first fibers. As an index indicating the degree of curvature, for example, Yb/W can be used.

Although the modification of Embodiment 2 has been described as applied to the case where the fibrous sheet 2 includes the second curved chopped fibers 5a instead of the microfibers 6, the various relationships described in Embodiment 1 similarly hold true in the modification.

Specifically, the following has been described in Embodiment 1: (1) Yb/W expressing the relationship between the straightness deviation and the cut length is preferably greater than or equal to 0.1 and less than or equal to 0.2; and (2) the relationship among the thickness t of the fibrous sheet 2, the cut length W of the curved chopped fibers 5, and the fiber inclination angle θ is expressed as sin θ=t/W and θ is preferably less than or equal to 15 degrees, more preferably, less than or equal to 10 degrees. These relationships hold true in the use of the second curved chopped fibers 5a instead of the microfibers 6. In other words, the first curved chopped fibers 5b and the second curved chopped fibers 5a are allowed to have the above-described relationships (1) and (2), thus obtaining the same advantages as those in Embodiment 1.

Comparative Example 3

In Comparative Example 3, a glass fiber sheet containing 100% straight chopped fibers (having an average diameter φ of approximately 6 μm) was made.

Since it is difficult to form a fibrous sheet 2' containing 100% curved chopped fibers 5 as described in Embodiment 1, a polyurethane binder was deposited on the fibers during paper-making and heat treatment was performed to join the glass fibers together.

Consequently, addition of approximately 2 wt % or more binder enabled the fibers to be formed into a sheet. The fibrous sheets 2' each containing approximately 2 wt % binder were stacked in a manner similar to Embodiment 1 to form a core member 3'. A vacuum heat insulator 1' including this core member 3' was made.

Thermal conductivity of the vacuum heat insulator 1' was measured to be 0.0017 W/(m·K).

Comparative Example 4

In Comparative Example 4, a fibrous sheet 2' including 100% curved chopped fibers 5' was made. This fibrous sheet 2' contained approximately 2 wt % binder as in Comparative Example 3. Thermal conductivity was measured to be 0.0017 W/(m·K), which is the same as that in Comparative Example 3 using the straight chopped fibers.

As described above, no difference in thermal conductivity was seen between the vacuum heat insulator 1' including 100% of the straight chopped fibers and the vacuum heat insulator 1 including 100% of the curved chopped fibers 5'.

Since Comparative Example 4 uses the fibers having a substantially single diameter of 6 μm, a relatively large amount of binder was needed. On the other hand, the modification uses the mixture of the thick curved chopped fibers (first curved chopped fibers 5b) and the thin curved chopped fibers (second curved chopped fibers 5a). The thin curved chopped fibers enter the spaces between the thick curved chopped fibers and function as media for fastening the thick curved chopped fibers together, such that the fibers can be fastened together with a small amount of binder.

Comparative Example 5

In Comparative Example 5, 80 wt % straight chopped fibers and 20 wt % microfibers 6' were mixed and the fibers were subjected to paper-making with addition of approximately 1 wt % binder, thus obtaining a fibrous sheet 2'.

A vacuum heat insulator 1' including a core member 3 including the obtained fibrous sheets 2' was made and thermal conductivity of the vacuum heat insulator 1' was measured to be 0.0016 W/(m·K).

As described above, it can be seen that the vacuum heat insulator 1 according to Embodiment 2 exhibits higher heat insulating performance than the vacuum heat insulators 1' in Comparative Examples 3 to 5.

[Advantages of Vacuum Heat Insulator 1 According to Embodiment 2]

The vacuum heat insulator 1 according to Embodiment 2 has the following advantages in addition to the advantages of the vacuum heat insulator 1 according to Embodiment 1.

The vacuum heat insulator 1 according to Embodiment 2 includes the curved chopped fibers 5 in a mixture proportion of 80 wt % and the microfibers 6, serving as curved fibers, in a mixture proportion of 20 wt %. The vacuum heat insulator 1 according to the modification includes the first curved chopped fibers 5b in a mixture proportion of 80 wt % and the second curved chopped fibers 5a, serving as curved fibers, in a mixture proportion of 20 wt %. In other words, the mixture proportion of the curved chopped fibers 5 in each of the vacuum heat insulator 1 according to Embodiment 2 and the vacuum heat insulator 1 according to the modification is higher than that in Embodiment 1. This reduces a likelihood that the axes of the fibers in the fibrous sheet 2 may incline in the stacking direction of the fibrous sheet 2, resulting in a reduction in thermal conductivity of the vacuum heat insulator 1.

Although the modification has been described as applied to the case where the second curved chopped fibers 5a are used as curved fibers, the present invention is not limited thereto. For example, curved fibers may include the second curved chopped fibers 5a in combination with the microfibers 6. For example, the first curved chopped fibers 5b in a proportion of 80 wt %, the second curved chopped fibers 5a in a proportion of 10 wt %, and the microfibers 6 in a proportion of 10 wt % may be mixed. In this case, the same advantages as those of the vacuum heat insulator 1 according to the modification of Embodiment 2 can be obtained.

The vacuum heat insulator 1 according to Embodiment 2 contains the binder because the mixture proportion of the curved chopped fibers 5 is higher than that in Embodiment 1. Addition of the binder causes fusion of the fibers, leading to an increase in thermal conductivity. However, increasing the mixture proportion of the curved chopped fibers 5 is significantly effective in reducing the thermal conductivity. This suppresses an increase in thermal conductivity of the vacuum heat insulator 1.

If most (for example, 90% or more) of the fibers are curved fibers, a small amount of (for example, 10% or less) straight chopped fibers may be mixed. In this case, the curved chopped fibers 5, serving as curved fibers of chopped fibers, may account for a majority of the chopped fibers such that the amount of straight chopped fibers is accordingly reduced. As described above, the same advantages as those of the vacuum heat insulator 1 according to Embodiment 2 and the vacuum heat insulator 1 according to the modification of Embodiment 2 can be obtained, regardless of the presence of a small amount of straight chopped fibers.

Furthermore, if most of the curved chopped fibers 5 have a degree of curvature Yb/W greater than or equal to 0.1 and less than or equal to 0.2, a small amount of curved chopped fibers 5 having a degree of curvature Yb/W less than 0.1 or greater than 0.2 may be mixed. In such a case, the same advantages as those of the vacuum heat insulator 1 according to Embodiment 2 and the vacuum heat insulator 1 according to the modification of Embodiment 2 can be obtained.

Embodiment 3

In Embodiment 3, the same components as those in Embodiments 1 and 2 are designated by the same reference numerals and the difference between Embodiment 3 and Embodiments 1 and 2 will be mainly described. Although the microfibers 6 made by the flame treatment are used in Embodiments 1 and 2, Embodiment 3 differs from Embodiments 1 and 2 in that microfibers 7 made by a centrifugal method are used.

(Details of Configuration of Vacuum Heat Insulator 1 According to Embodiment 3)

Figure 7:
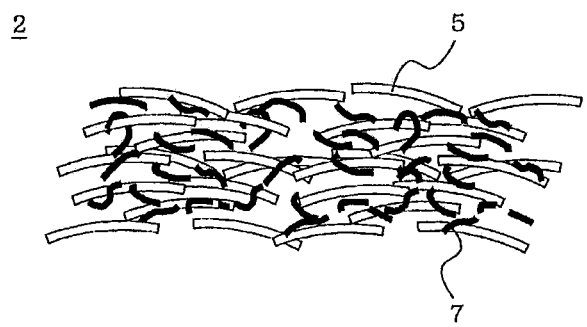
FIG. 7 is a schematic enlarged longitudinal sectional view of a fibrous sheet of a vacuum heat insulator according to Embodiment 3 of the present invention.

FIG. 7 is a schematic enlarged longitudinal sectional view of a fibrous sheet 2 of a vacuum heat insulator 1 according to Embodiment 3. As illustrated in FIG. 7, the fibrous sheet 2 includes curved chopped fibers 5 and the microfibers 7.

The microfibers 7 are crimped fibers made by the centrifugal method and have a diameter $\phi$ of approximately 4 μm and a fiber length of approximately 10 mm. The fibers made by the centrifugal method have a larger fiber diameter and are longer than the fibers made by the flame treatment, and are accordingly crimped spatially irregularly. Additionally, the fibers made by the centrifugal method resist being entangled because the fibers have a large fiber diameter.

The fibrous sheet 2 was made so as to include the curved chopped fibers 5 in a mixture proportion of 80 wt % and the microfibers 7 in a mixture proportion of 20 wt %. The amount of binder added was approximately 1 wt %. The curved chopped fibers 5 are the same as those in Embodiments 1 and 2.

The vacuum heat insulator 1 was made by the same procedure as that in Embodiments 1 and 2 and thermal conductivity of the vacuum heat insulator 1 was measured to be 0.0016 W/mK, which is equal to that in Comparative Example 5 in Embodiment 2.

Specifically, the amount of binder contained in the vacuum heat insulator 1 according to Embodiment 3 is approximately 0.5 wt % larger than that in the vacuum heat insulator 1 according to Embodiment 2. The microfibers 7 made by the centrifugal method contribute to a reduction in thermal conductivity to approximately 0.0016 W/mK. In addition, the centrifugal method allows higher productivity than flame treatment. Thus, the microfibers 7 can be made at lower cost than the microfibers 6 and the manufacturing cost of the vacuum heat insulator 1 can accordingly be reduced.

Comparative Example 6

In Comparative Example 6, a fibrous sheet 2' including curved chopped fibers 5, equivalent to those in Embodiment 1, in a mixture proportion of 80 wt % and microfibers 7', made by the centrifugal method, having an average diameter 4 of approximately 6 m and a fiber length of approximately 10 mm in a mixture proportion 20 wt % was made. The amount of binder added was a little less than approximately 2 wt %, which is slightly less than that for the straight chopped fibers in Comparative Example 3 of Embodiment 2. Thermal conductivity of a vacuum heat insulator 1' in Comparative Example 6 was measured to be 0.0017 W/mK, which is equal to that of the vacuum heat insulator 1' in Comparative Example 3.

As described above, although the amount of binder in Comparative Example 6 is less than that in Comparative Example 3, the thermal conductivity in Comparative Example 6 is equal to that in Comparative Example 3. This suggests that an increase in average diameter of the microfibers 7' increases heat transfer.

As the microfiber 6 is thicker, its stiffness is higher. The orientation of the curved chopped fibers 5 is significantly affected by the microfibers 6 curved irregularly, thus causing an increase in average fiber inclination angle θ of the curved chopped fibers 5. In addition, the thick microfibers serve as heat transfer media in the fiber stacking direction to facilitate heat transfer. The characteristics may accordingly be deteriorated. It is therefore preferred that the microfibers 6 be thinner than the curved chopped fibers 5. Furthermore, preferably, the curved chopped fibers 5 are oriented substantially parallel to the surface of the sheet and the microfibers 6, which are thin and flexible, are arranged among the curved chopped fibers 5.

As a result, making the average fiber diameter of the microfibers 7 smaller than that of the curved chopped fibers 5 suppresses an increase in thermal conductivity of the vacuum heat insulator 1.

The same applies to the vacuum heat insulators 1 in Embodiments 1 and 2.

In other words, making the average fiber diameter of the microfibers 6 smaller than that of the curved chopped fibers 5 suppresses an increase in thermal conductivity of the vacuum heat insulator 1.

[Advantages of Vacuum Heat Insulator 1 according to Embodiment 3]

The vacuum heat insulator 1 according to Embodiment 3 includes the fibrous sheets 2 each including the curved chopped fibers 5 and the microfibers 7 made by the centrifugal method that allows higher productivity than flame treatment. Advantageously, an increase in manufacturing cost of the vacuum heat insulator 1 according to Embodiment 3 and a reduction in heat insulating performance thereof can be suppressed.

Embodiment 4

In Embodiment 4, the same components as those in Embodiments 1 to 3 are designated by the same reference numerals and the difference between Embodiment 4 and Embodiments 1 to 3 will be mainly described. Although the microfibers 6 made by the flame treatment or the microfibers 7 made by the centrifugal method are used in each of Embodiments 1 to 3, Embodiment 4 differs from Embodiments 1 to 3 in that both the microfibers 6 and the microfibers 7 are used.

Figure 8:
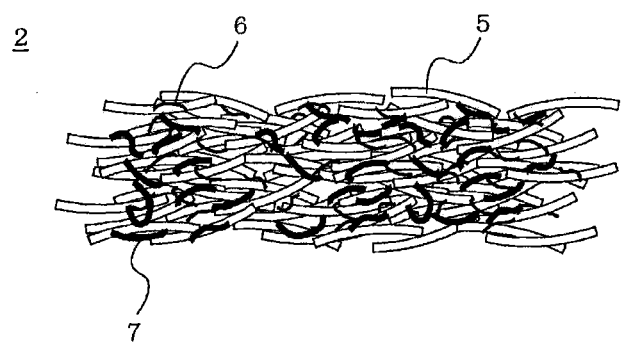
FIG. 8 is a schematic enlarged longitudinal sectional view of a fibrous sheet of a vacuum heat insulator according to Embodiment 4 of the present invention.

FIG. 8 is a schematic enlarged longitudinal sectional view of a fibrous sheet 2 of a vacuum heat insulator 1 according to Embodiment 4. In FIG. 8, the fibrous sheet 2 includes "the same curved chopped fibers 5 as those in Embodiments 1 to 3" and "the microfibers 6 made by the flame treatment in Embodiments 1 and 2 and the microfibers 7 made by the centrifugal method in Embodiment 3".

[Advantages of Vacuum Heat Insulator 1 according to Embodiment 4]

Since the vacuum heat insulator 1 according to Embodiment 4 includes this fibrous sheet 2, the vacuum heat insulator 1 has an intermediate function between that of the vacuum heat insulators 1 according to Embodiments 1 and 2 and that of the vacuum heat insulator 1 according to Embodiment 3.

Specifically, the level of advantages in manufacturing cost and heat insulating performance of the vacuum heat insulator 1 according to Embodiment 4 is intermediate between that in Embodiments 1 and 2 and that in Embodiment 3. Proper selection taking into account the cost-performance of a product to which the vacuum heat insulator 1 is applied achieves higher-level balance between the cost and the heat insulating performance.

Embodiment 5

Figure 9:
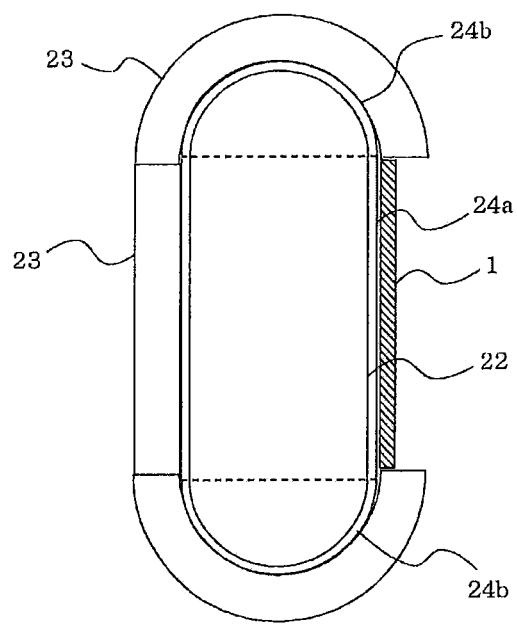
FIG. 9 is a schematic longitudinal sectional view of a heat retaining structure according to Embodiment 5 of the present invention.

FIG. 9 is a schematic longitudinal sectional view of a heat retaining structure (heat retaining tank 22) according to Embodiment 5.

In FIG. 9, the heat insulating tank 22 is at least partly covered with a vacuum heat insulator 1. Specifically, approximately ⅔ a cylindrical side wall 24a of the heat retaining tank 22 is wound with the vacuum heat insulator 1 which is substantially cylindrical. The remaining approximately ⅓ the side wall 24a and upper and lower tank heads 24b are covered with non-vacuum heat insulators 23.

The vacuum heat insulator 1 is identical in specifications to that according to Embodiment 1 and a procedure of making the vacuum heat insulator 1 is the same as that described in Embodiment 1. The vacuum heat insulator 1 has been bent in a substantially cylindrical shape so as to fit the cylindrical heat retaining tank 22.

The non-vacuum heat insulator 23 is an expanded polystyrene foam (EPS) heat insulator. The non-vacuum heat insulator 23 for each of upper and lower parts of the heat retaining tank 22 is shaped so as to fit the tank head 24b.

The tank is filled with water boiled by a heating source (not illustrated). As regards the heating source, for example, direct heating by an electric heater disposed inside the tank may be used. Alternatively, indirect heating with circulating water from an exhaust heat recovery circuit of another heating source, such as a fuel cell power generating system, may be used.

Heat release from the heat retaining tank 22 having a diameter of 600 mm and a capacity of 370 L and filled with hot water heated at 90 degrees C. by the electric heater was evaluated in an environment in which outside temperature was set to 4 degrees C.

First, the vacuum heat insulator 1 having a thickness of 8 mm and the non-vacuum heat insulators 23 having a thickness of 50 mm were used. An amount of heat release was measured after a lapse of approximately eight hours.

Next, this amount of heat release was compared with that of another tank provided with the vacuum heat insulator 1' in Comparative Example 1. It has been shown that the amount of heat release from the heat retaining tank 22 provided with the vacuum heat insulator 1 according to Embodiment 1 was approximately 4% lower than that from the other tank. The use of the vacuum heat insulator 1 according to Embodiment 1 allows the cylindrical heat retaining tank to achieve high insulation against outside air.

Although Embodiment 5 has been described as applied to the case where the heating source is used, a cooling source may be used.

For example, water cooled by a refrigerator or the like, alternatively, water ice directly or indirectly removes heat from the heat retaining tank 22 such that the inside of the heat retaining tank 22 is kept at a temperature lower than an ambient temperature. As described above, such a cooling source may be used in conjunction with the vacuum heat insulator 1, allowing the heat retaining tank 22 to achieve improved heat insulation.

Modification of Embodiment 5

Figure 10:
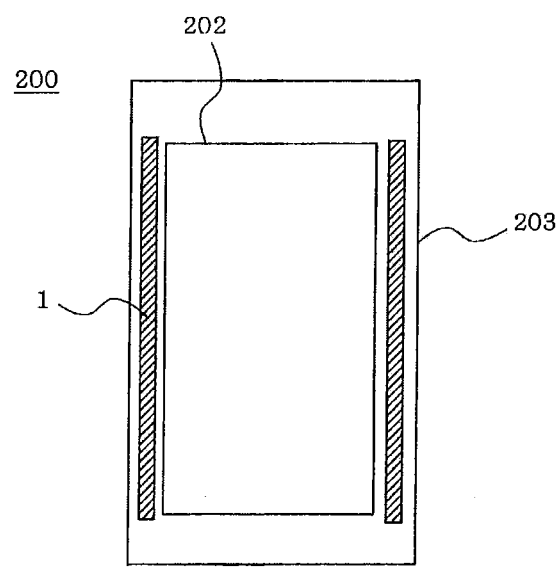
FIG. 10 is a schematic longitudinal sectional view of a heat retaining structure different from that of FIG. 9.

FIG. 10 is a schematic longitudinal sectional view of a heat retaining structure 200 different from that of FIG. 9.

In FIG. 10, the heat retaining structure 200 includes an outer case 201, an inner case 202 disposed in the outer case 201, and the vacuum heat insulator 1 disposed in a space between the outer case 201 and the inner case 202.

A space in the heat retaining structure 200 which is defined between the inner case 202 and the outer case 201 and in which the vacuum heat insulator 1 is not disposed is filled with a heat insulator 203 of polyurethane foam. Applying the vacuum heat insulator 1 according to any of Embodiments 1 to 4 to the heat retaining structure 200 allows the heat retaining structure 200 to offer excellent heat insulating performance and long-term reliability.

Embodiment 6

Figure 11:
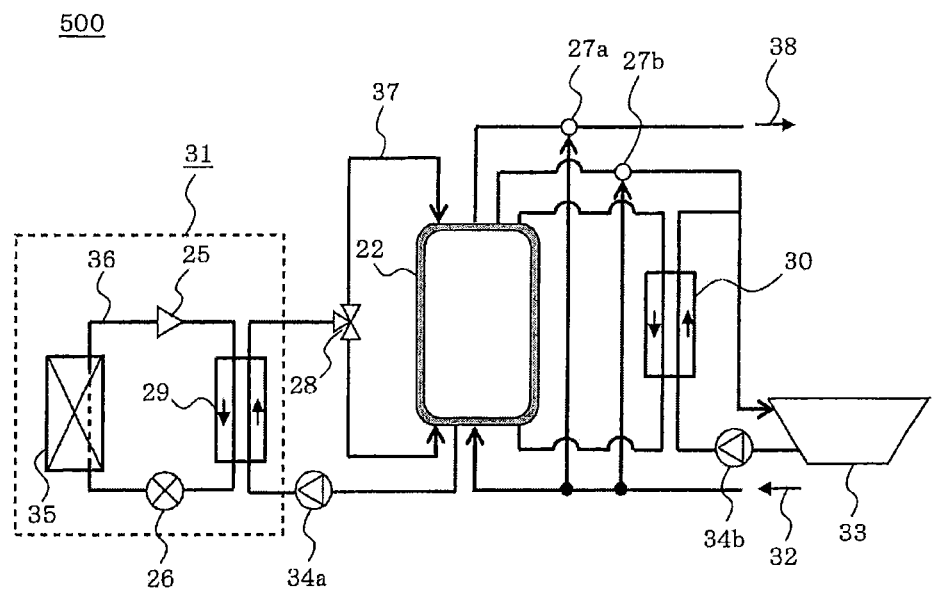
FIG. 11 is a diagram illustrating an exemplary system configuration of heat pump water heating according to Embodiment 6 of the present invention.

FIG. 11 is a diagram illustrating an exemplary system configuration of heat pump water heating 500 according to Embodiment 6.

This heat pump water heating 500 includes the heat retaining tank 22 according to Embodiment 5.

In FIG. 11, a heat pump unit 31 includes a refrigerant circuit 36 through which a circulating medium circulates and a plurality of devices through which the medium flows. Specifically, the heat pump unit 31 includes an air heat exchanger 35 that receives heat from the atmosphere and gives heat to the circulating refrigerant, a compressor 25 that pressurizes the circulating medium, a heat exchanger 29 that removes heat from the circulating refrigerant, and an expansion valve 26 that expands the volume of the circulating medium. In the refrigerant circuit 36, the heat exchanger 29, serving as a first heat exchanger, functions as a condenser and the air heat exchanger 35, serving as a second heat exchanger, functions as an evaporator.

Another medium heated by the heat exchanger 29 is led to upper part of the heat retaining tank 22 through a three-way valve 28. A water pump 34a is disposed between lower part of the heat retaining tank 22 and the heat exchanger 29. As described above, the heat exchanger 29, the three-way valve 28, the heat retaining tank 22, and the water pump 34a are included in a medium circuit 37.

The upper part of the heat retaining tank 22 is connected to a hot water circuit 38 for supply of hot water drawn from the heat insulating tank 22 and mixed with city water 32 through a mixing valve 27a and a circuit through which hot water drawn from the heat insulating tank 22 and mixed with the city water 32 through a mixing valve 27b is supplied to a bathtub 33.

Furthermore, the bathtub 33 is connected to a circuit through which the bathtub 33 is connected to a water pump 34b and a bath heat exchanger 30.

The city water 32 is led to the lower part of the heat retaining tank 22.

An operation for heating water in the heat retaining tank 22 will now be described.

The heat pump unit 31 uses as refrigerant, for example, $CO_2$. The refrigerant is circulated through the refrigerant circuit 36. The $CO_2$ refrigerant receives heat from the atmosphere in the air heat exchanger 35 and is then compressed by the compressor 25, so that the $CO_2$ refrigerant rises in temperature to a hundred and several tens of degrees C. After that, the CO$_2$ refrigerant exchanges heat with, for example, water flowing through the medium circuit 37 in the heat exchanger 29.

The temperature of the CO$_2$ refrigerant, from which heat has removed, is further reduced in the expansion valve 26. The CO$_2$ refrigerant is then supplied to the air heat exchanger 35 and is again circulated. The water heated in the heat exchanger 29 is heated to, for example, a little over 90 degrees C., and is then supplied to the upper part of the heat retaining tank 22. Low-temperature cold water is drawn from the lower part of the heat retaining tank 22 and is then supplied to the heat exchanger 29 by the water pump 34*a*.

As described above, the heat pump unit 31 is used as a heating source to heat the water in the heat retaining tank 22.

The heated hot water is used for various purposes. For example, the hot water drawn from the upper part of the heat retaining tank 22 (by forcing the hot water to move upward under pressure applied by the city water 32 supplied to the lower part of the heat retaining tank 22) is mixed with the city water 32 in the mixing valve 27*a* such that the hot water is adjusted to a proper temperature, and is then supplied to the hot water circuit 38 for hot water supply.

Similarly, the hot water mixed with the city water 32 in the mixing valve 27*b* is supplied to the bathtub 33.

To additionally heat hot water in the bathtub 33, the bath heat exchanger 30 exchanges heat between the hot water from the bathtub 33 and the hot water from the heat retaining tank 22, and the heated hot water is used.

The vacuum heat insulator 1 was applied to the heat retaining tank 22 according to Embodiment 5 and the performance of a home water heater system including this tank was evaluated. The efficiency of the water heater system was evaluated in accordance with JIS C 9220. As a result, it was found that the annual efficiency of water heating was increased by approximately 0.5%.

The water heater system including the heat retaining tank 22 provided with the vacuum heat insulator 1 according to any of Embodiments 1 to 4 offers improved energy-saving performance.

Modification of Embodiment 6

Figure 12:
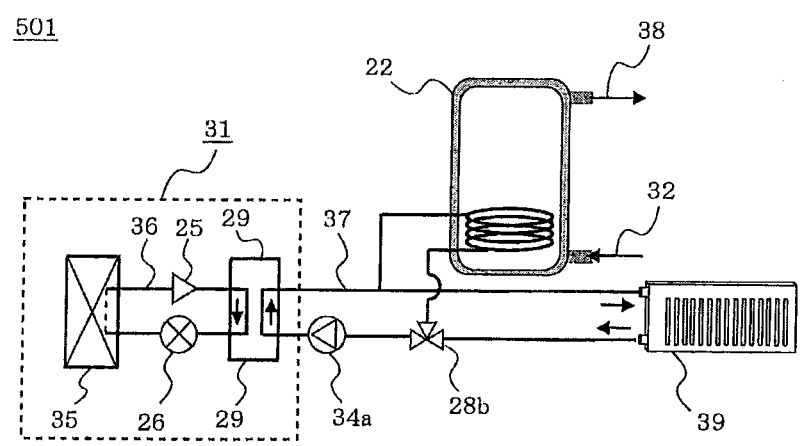
FIG. 12 is a diagram illustrating an exemplary system configuration of heat pump water heater different from that of FIG. 11.

FIG. 12 is a diagram illustrating an exemplary system configuration of a heat pump water heater 501 different from that in FIG. 11.

In FIG. 12, a medium circuit 37 includes a circuit for circulating a heat retaining tank 22 through a three-way valve 28*b* and another circuit branching off of the circuit and connecting to a radiator 39. The circulation circuit passing through the heat retaining tank 22 is geometrically separated from water in the heat retaining tank 22. As refrigerant in a refrigerant circuit 36, R410A is used. The other configuration is the same as that in FIG. 11.

Hot water at a little less than approximately 70 degrees C., heated by a heat exchanger 29 included in a heat pump unit 31, flowing through the medium circuit 37 is typically supplied to the radiator 39 and is used to heat a room. The hot water transfers heat to the atmosphere in the radiator 39, so that the water decreases in temperature. The water is returned to the heat exchanger 29 by a water pump 34*a*, thus defining the medium circuit 37. Switching the three-way valve 28*b* stops supply of hot water to the radiator 39 and allows the hot water to flow through a spiral pipe disposed in the heat retaining tank 22, thus heating water in the heat retaining tank 22. The heat retaining tank 22 stores the heated water, or hot water. The hot water in the heat retaining tank 22 is used for hot water supply to a shower, for example.

FIG. 12 illustrates the water heating system mainly intended for heating. It is necessary to store hot water in the heat retaining tank 22 during a period with a low heating load and keep the water hot. Since the heat pump water heater 501 includes the heat retaining tank 22 provided with the vacuum heat insulator 1, heat release from the heat retaining tank 22 is reduced. This water heater system offers improved energy-saving performance.

Although exemplary ways of heating water in the heat retaining tank 22, additional heating of water in the bathtub 33, and examples of hot water supply have been described above, the present invention is not limited thereto. Water in the tank may be directly heated by using the principle of a heat pump or may be indirectly heated such that the medium flowing through the medium circuit 37 is geometrically separated from the water in the tank.

Although the use of CO$_2$ or R410A as an example of the refrigerant circulating through the refrigerant circuit 36 has been described above, any other refrigerant may be used. For example, isobutane may be used depending on use conditions.

REFERENCE SIGNS LIST

1, vacuum heat insulator; 2, fibrous sheet; 3, core member; 4, cover member; 4*a*, cover sheet; 5, curved chopped fiber; 5*a*, second curved chopped fiber; 5*b*, first curved chopped fiber; 6, 7, microfiber; 8, curved inorganic filament; 22, heat retaining tank; 23, non-vacuum heat insulator; 24*a*, side wall; 24*b*, tank head; 25, compressor; 26, expansion valve; 27*a*, 27*b*, mixing valve; 28, 28*b*, three-way valve; 29, heat exchanger; 30, bath heat exchanger; 31, heat pump unit; 32, city water; 33, bathtub; 34*a*, 34*b*, water pump; 35, air heat exchanger; 36, refrigerant circuit; 37, medium circuit; 38, hot water circuit; 39, radiator; 200, heat retaining structure; 201, outer case; 202, inner case; 203, heat insulator; 500, heat pump water heating; and 501, heat pump water heater.

The invention claimed is:

1. A vacuum heat insulator comprising:
a core member being a stack of fibrous sheets; and
a cover member enclosing the core member,
wherein each of the fibrous sheets includes first curved chopped fibers and curved fibers, and
wherein the first curved fibers have a cut length W, each of the fibrous sheets enclosed in the cover member in a sealed state has a thickness t, and t/sin 15 degrees≤W is satisfied.

2. The vacuum heat insulator of claim 1, wherein the curved fibers include second curved chopped fibers different in at least one of degree of curvature, fiber length, and average fiber diameter from the first curved chopped fibers.

3. The vacuum heat insulator of claim 1, wherein the curved fibers have a smaller average fiber diameter than the first curved chopped fibers.

4. The vacuum heat insulator of claim 1, wherein the curved fibers include microfibers.

5. The vacuum heat insulator of claim 4, wherein the microfibers include inorganic fibers made by flame treatment.

6. The vacuum heat insulator of claim 4, wherein the microfibers include inorganic fibers made by a centrifugal method.

7. The vacuum heat insulator of claim 1, wherein the first curved chopped fibers have the cut length W and a straightness deviation Yb having a relationship satisfying $0.1 \leq Yb/W \leq 0.2$.

8. The vacuum heat insulator of claim 1, wherein each of the fibrous sheets contains less than or equal to 1 wt % of one of inorganic and organic binder for binding the first curved chopped fibers and the curved fibers.

9. A heat retaining tank for storing a medium heated by a heating source or cooled by a cooling source, the heat retaining tank being at least partly covered with the vacuum heat insulator of claim 1.

10. A heat pump water heater comprising:
- a refrigerant circuit including a compressor, a first heat exchanger functioning as a condenser, a pressure reducing device, and a second heat exchanger functioning as an evaporator; and
- a medium circuit through which a medium flows, the medium circuit including the first heat exchanger and the heat retaining tank of claim 9, the medium exchanging heat with refrigerant flowing through the refrigerant circuit in the first heat exchanger.

11. A heat retaining structure comprising:
an outer case;
an inner case disposed in the outer case; and
the vacuum heat insulator of claim 1 disposed between the outer case and the inner case.

* * * * *